United States Patent [19]

McGee

[11] 4,315,970
[45] Feb. 16, 1982

[54] ADHESION OF METALS TO SOLID SUBSTRATES

[75] Inventor: James B. McGee, Sanford, Mich.

[73] Assignee: Dow Corning Corporation, Midland, Mich.

[21] Appl. No.: 189,433

[22] Filed: Sep. 22, 1980

Related U.S. Application Data

[63] Continuation-in-part of Ser. No. 120,197, Feb. 11, 1980, abandoned.

[51] Int. Cl.³ .................. B32B 15/08; B32B 17/10
[52] U.S. Cl. ............................. 428/412; 427/164; 427/166; 427/167; 427/387; 427/404; 427/407.2; 428/429; 428/425.8; 428/447
[58] Field of Search ............... 428/447, 429, 412; 427/387, 164, 167, 166, 404, 407.2, 162, 389.8, 407.3

[56] References Cited

U.S. PATENT DOCUMENTS

| | | |
|---|---|---|
| 2,847,322 | 8/1958 | Drummond . |
| 3,088,847 | 5/1963 | Pines . |
| 3,508,983 | 4/1967 | Origer et al. . |
| 3,986,997 | 10/1976 | Clark . |
| 4,052,524 | 10/1977 | Harakas et al. . |
| 4,059,473 | 11/1977 | Okami . |
| 4,100,312 | 7/1978 | Lombardo et al. . |
| 4,179,537 | 12/1979 | Nykowski . |

FOREIGN PATENT DOCUMENTS

| | | |
|---|---|---|
| 52-16586 | 2/1977 | Japan . |
| 51-73273 | 8/1976 | Japan . |
| 1550532 | 8/1979 | United Kingdom . |

*Primary Examiner*—Ralph S. Kendall
*Attorney, Agent, or Firm*—Robert L. McKellar

[57] ABSTRACT

What is disclosed is a method of improving the adhesion of thin metal coatings to various solid substrates by pretreatment of the solid substrates using organofunctional silanes or mixtures of organofunctional silanes with organosilanes and thereafter depositing metals to form films or coatings.

54 Claims, No Drawings

ADHESION OF METALS TO SOLID SUBSTRATES

BACKGROUND OF THE INVENTION

This application is a continuation-in-part of application Ser. No. 120,197, filed Feb. 11, 1980 abandoned.

There are many applications where it is desirable to form thin metallic films or coatings on various solid substrates. An example of such an application is the formation of silvered mirrors wherein very thin films or coatings of silver metal are deposited from chemical solution onto glass or similar substrates. Also, large reflectors for solar applications have been formed from vapor deposited silver or aluminum on solid substrates.

Some of the problems associated with prior art methods of forming thin metallic coatings on solid substrates have been the cumbersome application methods, for example, in producing silvered mirrors from chemical solution and, the inability to retain the metallic coating on the solid substrate for long periods of time. Also, in vapor deposition, vacuum metallizing, ion plating, spraying and similar methods, the metallized surface can only retain its aesthetic value of the substrate has been pre-treated with some composition which can mask or eliminate the scratches, pits and voids in the solid substrate. Such materials are generally curable organic coatings which are first coated onto the solid substrates at such thicknesses that they will physically fill the scratches, pits and voids, and are then cured. The metallizing is then carried out on the surface of the organic coating. Unfortunately, because of the presence of these organic "basecoats", the manufacturer is faced with a variety of adhesion problems between the basecoats and the solid substrate and the basecoat and the thin metallic film or coating. This problem is enhanced considerably when the manufactured item is intended to be used outdoors and is subject to the ravages of the weather.

What is needed therefore is an improved method of forming adherent metallic films or coatings on solid substrates and improved metallic coated materials.

According to the present invention there is disclosed an improved method of adhering a thin metallic film or coating to a solid substrate. The improved method utilizes a specific silane or mixtures of silanes to strongly adhere the thin metallic film or coating to solid substrates.

It has been known for a number of years that silanes are useful for bonding many materials to many various surfaces. It is generally recognized that silane coupling agents are not universal coupling agents such that any given silane will bond all materials to all substrates. Instead, it is generally accepted that specific silanes can be used for adhesion of specific materials to specific substrates, that is, the silane must be matched to the application and it cannot be assumed that all silanes will work in all applications.

In a recent British Pat. No. 1,550,532, issued Aug. 15, 1979, it is disclosed that thin films or coatings of metals can be adhered to plastic substrates by the use of a combination of alkoxysilanes, alkylsilicates and copolymers of alkyl acrylate or alkyl methacrylate with hydroxyalkyl acrylates or hydroxyalkyl methacrylates. This patent discloses that the inventive composition therein serves two purposes i.e. the polymeric material is a film former and the silane enhances adhesion of metal overcoat. The alkoxy silanes shown there are of the formula $R_nSi(OR')_{4-n}$ wherein n is 1, 2 or 3, R' is a $C_1$-$C_6$ hydrocarbon group and R' is a $C_1$-$C_4$ alkyl group. This prior art material and method appears to work quite well as long as articles for use indoors are contemplated. It has been observed that this material does not have adequate adhesion of the deposited metal to the polymeric film which results in loss of adhesion of the thin metallic film.

It has now been found that the adhesion of thin metal films to various substrates can be enhanced by the use of certain silanes and silane mixtures on certain substrates such that the articles prepared using the inventive method are durable, weatherable and have brilliance and enhanced specularity.

THE INVENTION

What is disclosed herein is a method of forming an adherent continuous thin metal surface on a substrate and the articles prepared thereby.

Thus, what is disclosed is a method of forming an adherent metal surface on a substrate by (I) treating a solid substrate with at least one organofunctional silane, or the partial hydrolyzate thereof, having the general formula

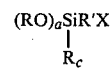

or a mixture of an organofunctional silane or the partial hydrolyzate thereof with a different organosilane, or the partial hydrolyzate thereof, which has the general formula $(RO)_bSiR''_{4-b}$ in which formulae R is an alkyl radical of 1-4 carbon atoms, R' is a difunctional hydrocarbon radical having from 1-12 carbon atoms or a

radical, X is an $-NH_2$,

—SH, OH or Cl radical, R'' is an —(R'X) radical, a and b each have a value of 2 or 3, c has a value of 0 or 1 and a+c=3; (II) drying the silane treated surface until the majority of volatile materials have been removed and thereafter, (III) depositing a metal on the silane treated surface to form a thin continuous film or coating thereon.

The organofunctionalsilanes used in step I have the general formula

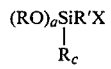

wherein R is an alkyl radical of 1-4 carbon atoms, R' is a difunctional hydrocarbon radical having from 1-12 carbon atoms or a

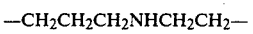

radical, X is an $-NH_2$,

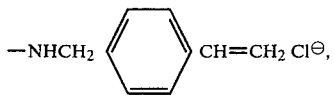

—SH, OH or Cl radical. R is preferably the methyl radical. a has a value of 2 or 3. c has a value of 0 or 1 and a+c=3. Thus, contemplated within the scope of the formula

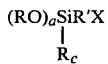

are such organofunctional silanes as $(CH_3O)_3Si(CH_2)_3NH(CH_2)_2NH_2$,

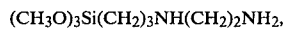

$(CH_3O)_3Si(CH_2)_3SH$, $(CH_3O)_3Si(CH_2)_3Cl$, $(CH_3O)_3Si(CH_2)_3OH$,
$CH_3(CH_3O)_2Si(CH_2)_3NH(CH_2)_2NH_2$,

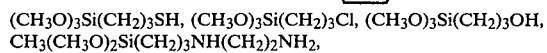

$CH_3(CH_3O)_2Si(CH_2)_3SH$, $CH_3(CH_3O)_2Si(CH_2)_3Cl$ and
$CH_3(CH_3O)_2Si(CH_2)_3OH$.

It should be noted that contemplated within the scope of this invention are the partial hydrolyzates of these organofunctional silanes. By "partial hydrolyzate", the inventor herein means the water soluble or water miscible product formed when the organofunctional silane is treated with water to hydrolyze all or a part of the alkoxy groups on the molecule. Sometimes, in order to effect the hydrolysis, a small amount of acid is required along with the water. Whenever "hydrolyzate" or "partial hydrolyzate" is used herein, it shall mean that it contains the hydrolyzed silane or silanes, water for hydrolysis and the alcohol solvent formed by the cleavage of the alkoxy groups from the silane.

The treatment of the substrate can be carried out with the organofunctional silane or its partial hydrolyzate alone but contemplated within the scope of this invention is a mixture of the organofunctional silane or its partial hydrolyzate with a different organosilane having the general formula $(RO)_bSiR''_{4-b}$ wherein R has the same meaning as R above, R'' can be an —(R'X) radical and b has a value of 2 or 3. As indicated above for the formula

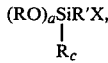

the partial hydrolyzates of $(RO)_bSiR''_{4-b}$ are also part of this invention. R is preferably methyl.

The organofunctional silanes and the organosilanes are well-known commercial silanes and it is believed that their manufacture is adequately set out in the art and need not be repeated herein.

Whenever it is required to use a mixture of the silanes, it is done by a simple mixing technique. The neat silanes can be mixed first then cohydrolyzed or they can be hydrolyzed separately and the hydrolyzates mixed thereafter.

For purposes of this invention, whenever a mixture of silanes is required, it is generally preferred that they be mixed in a ratio of 1:10 to 10:1 organofunctional silane to organosilane on a weight basis. The ratio applies to the weight of the silanes before hydrolysis.

As indicated above, some of the silanes require the presence of a small amount of acid to enhance hydrolysis. Such acids are, for example, hydrochloric and acetic. This acid requirement is well-known in the silane hydrolysis art.

It is generally preferred that the silanes be hydrolyzed prior to mixing. After the silanes are hydrolyzed, simple hand shaking of the hydrolysis vessel i.e. a bottle or flask will suffice to force the hydrolysis reaction. Generally, the hydrolysis mixture is used at this point without further modification or purification.

The amount of total silane in the hydrolysis mixture can be from 0.01 to 35 weight percent.

Whenever the silanes are to be used neat, they can be dissolved in solvents which are soluble with or miscible with water such as isopropanol, methanol, butanol, methylcellosolve or the like. Mixtures of such types of solvents are contemplated within the scope of this invention. these solvents can also be used with the hydrolyzed silanes to enhance film forming abilities, etc.

The silanes or silane solutions can be applied to the substrate by any method which is convenient for the user. Such methods as dipping, flowing and spraying are most satisfactory for this invention.

The substrates useful in this invention are those which are solid substrates. Thus, most every useful solid substance which makes up an article can be the substrate of this invention. Such substrates can be, for example, plastics such as acrylonitrile-butadiene-styrene copolymers, Sioplas ® crosslinked polyethylene, polycarbonates, polyethylene terephthalates such as Mylar ®, polyimides such as Kapton ®, polyphenylene oxides such as Noryl ®, polyphenylene sulfides such as Ryton ® and mineral filled nylons such as Minlon ®, acrylics, urethanes, epoxys and polyesters, just to name a few. Wood, cardboard, glass, metals, silicone rubbers and resins, urethane foams and polyvinylchloride foams are examples of other useful substrates.

One method taught herein consists of treating a solid substrate with an organofunctional silane or a mixture of an organofunctional silane and an organosilane and then allowing the silane treated surface to dry until the majority of the volatile materials have been removed from the treated surface. What is meant by volatile materials are the solvents, water and low molecular weight products that have been formed upon hydrolysis. What is meant by the "majority" of volatile materials is that the surface should be tack free or nearly tack free to the finger touch. This can be accomplished in a number of ways. For example, the treated surfaces can be left at room temperature for a period of time, perhaps days, to allow slow evaporation of the volatile materials into the atmosphere. Since time is usually a factor in commercial manufacture, however, the articles can be heated to remove volatiles. Vacuum can be applied to reduce the pressure and enhance volatization. The inventor herein has used a number of methods to cause the removal of volatiles in a short period of time, such as 1–5 second, by heating and applying vacuum simultaneously.

Any method of volatile material removal that fits the manufacturers mode of manufacture is contemplated herein.

After the volatile materials are removed, the thin metal coating is applied. Generally, any method by which thin, continuous metal coatings can be applied will suffice for this invention. Methods such as vapor deposition, electroplating, sputtering, ion plating and spraying are preferred. However, applying the thin, continuous metal coating can be accomplished from current methods of chemical solution application without detrimental affects on the adhesion promoting coating.

Metals that are useful in this invention are any metals that can be vapor deposited, electroplated, sputtered, ion plated, sprayed or applied from chemical solution. Such metals as copper, nickel, tin, silver, silver solder, gold, aluminum, platinum, titanium, zinc and chrome are preferred.

For purposes of this invention "thin" means the thickness of the metal film that is required to give a continuous, coherent film or coating. Generally, these coatings are less than 30 microns thick.

The articles prepared in this invention can be covered by clear protective coatings such as the silicone resins set forth in U.S. Pat. No. 3,986,997. These materials are generally referred to as "topcoats" and are well-known in the art.

As indicated earlier, the surfaces of some substrates are soft enough that they are blemished by gouges or scratches during the manufacture of the article and in order to end up with a product that is aesthetically pleasing, the blemishes must be eliminated since simple metal plating over them with thin coatings or films allows the blemishes to show through.

A common method of covering over the blemishes is to basecoat the substrate with a material such as curable organic polymers. The organic polymer fills the blemishes and gives a smooth, flat, blemish free surface over which the thin metal coating can be applied.

Another invention herein therefore contemplates the use of such basecoat materials in conjunction with the method of, and materials of, this invention. Thus, this invention also deals with the treatment of a substrate with a basecoat and the application of the silane or silanes of this invention to said basecoat. The metal is then applied to the silane treated basecoat. Preferred for this invention are certain silicone basecoats. More specifically, the preferred basecoat is one that is selected from the siloxane coatings disclosed in U.S. Pat. No. 3,986,997 issued to Harold A. Clark Oct. 19, 1976. The siloxane coatings disclosed in that patent are herein incorporated by reference.

In using a base coat, the substrate is cleaned by any conventional process and then the basecoat is applied and cured. Generally, for the Clark coating, 6-8 hours at 150° C. is required. Some basecoats require only a few minutes air dry time. In certain circumstances, depending on the substrate and the basecoat, a primer may be required. The silanes of this invention, for example, could be used as such primers. The cured basecoat is then top treated with the silane or mixtures of silanes, dried, then overcoated with the metal of choice. Thus, contemplated within the scope of the claims of this invention are substrates named herein overcoated with organic or silicone basecoats and then treated with the inventive silanes or silane mixtures.

A third aspect of this invention is the use of the silanes of this invention in conjunction with certain curable coatings to enhance the adhesion of the thin metal films or coatings. Whereas, the essence of this invention where first presented herein is the treatment of certain substrates or the treatment of certain substrates basecoated with organic or silicone curable coatings, this further aspect of this invention deals with the metal coating of curable organic or silicone basecoats which have included in them, before cure, the inventive silane or silanes disclosed herein.

This invention therefore also consists of incorporating in the curable basecoat, the silanes of this invention and then depositing metals to form films or coatings thereon. The invention therefore also consists of a method of forming an adherent metal surface on a substrate by (I) treating a solid substrate with a curable organic or silicone basecoat which contains at least one organofunctional silane, or the partial hydrolyzate thereof, having the general formula

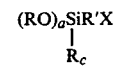

or a mixture of an organofunctional silane, or the partial hydrolyzate thereof, with a different organosilane, or the partial hydrolyzate thereof, which has the general formula $(RO)_b SiR''_{4-b}$ in which formulae R is an alkyl radical of 1-4 carbon atoms, R' is a difunctional hydrocarbon radical having from 1-12 carbon atoms or a —CH$_2$CH$_2$CH$_2$NHCH$_2$CH$_2$— radical, X is an —NH$_2$,

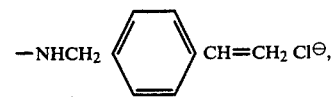

—SH, OH or Cl radical, R" is an —(R'X) radical, a and b each have a value of 2 or 3, c has a value of 0 or 1 and a+c=3; (II) drying the basecoat until the majority of volatiles have been removed and thereafter; (III) depositing a metal on the basecoat to form a thin continuous film or coating thereon.

The organic basecoats useful herein are those currently being used as basecoats for metal deposition on solid articles. These materials are air dry acrylics or urethanes which can be used with or without heat cure. Such a material, for example, is EB-1, an acrylic polymer manufactured by Red Spot Paint and Varnish Co., Inc, Evansville, Ind.

The amount of silane or silanes incorporated in the basecoat is 0.1 to 10 weight percent based on the weight of silane(s) and basecoat. Simple mixing of the silane into the basecoat is all that is required. It should be noted that such mixing need not be done under anhydrous conditions as the adhesive effect is enjoyed whether the silanes are used neat or in the pre-hydrolyzed condition. The basecoat is dried and/or cured, depending on the application where it is being used, and then the metal top coat is applied by one of the methods indicated earlier.

Articles which are manufactured by the methods of the inventions herein have enhanced adhesion, weathering, durability and enhanced efficiency and specularity whenever the metal surface is a mirrored surface.

The following examples are not to be construed as limiting the invention which is set forth in the claims.

Several silanes were evaluated in this invention by observing the adhesion of the metal coating. An appearance determination was made which was subjective and was based upon such characteristics as continuum of film, brilliance, specularity and the presence or absence of voids, pockmarks and the like. An excellent film is one which is continuous, without voids and/or pockmarks and has brilliance and high specularity. Specularity is a term used in the mirrored surfaces art which means the degree of light transmitted from the surface of a mirror i.e. how good are the mirror properties. Adhesion was measured subjectively by rubbing the metal surface with a cloth saturated with acetone, methanol or isopropanol using moderate pressure unless a different method is indicated. The degree to which the metal surface survived this treatment is reported. No removal of the coating is considered "excellent". "Good" is when some slight abrasion occurred. "Fair" means noticeable removal of metal. "Poor" means the removal of essentially all of the metallic coating. "None" means all the coating was removed.

EXAMPLE 1

The following samples were prepared to observe which silanes or combinations of silanes would give the best enhanced adhesion between a given substrate and certain metals. Silanes or combinations of silanes were made at the concentrations shown by a method which involved the hydrolysis of each silane and the eventual combinations of the silanes to give the adhesion promoter used on the substrate. Table I in this example shows the various silanes tested.

Silane A is $(CH_3O)_3Si(CH_2)_3NH(CH_2)_2NH_2$. Silane B is $(CH_3O)_3Si(CH_2)_3SH$. Silane C is

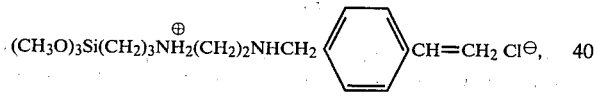

Silane D is $(CH_3O)_3Si(CH_2)_3Cl$, and Silane E is $HO(CH_2)_3Si(OCH_3)_3$.

Results are on Table II. IPA is isopropanol. MeOH is methanol. gms is grams.

PRIMER PREPARATION

Silane A (8 gms), IPA (8 gms) and 1.12 gms of water were mixed with agitation in a small 1 ounce glass bottle with a screw-top lid. The bottle was allowed to stand overnight (about 16-20 hrs). The material was then diluted with 800 gms of IPA upon transferring to a larger bottle.

Silane B (12.35 gms), IPA (717.65 gms), Glacial acetic acid (30 gms) and 40 gms of water were mixed together in the order given herein.

Silane C (24 gms) and 1.2 gms of water were mixed together and allowed to stand overnight (16-20 hrs). The material was then diluted by 800 gms of MeOH.

Three gms of the Silane D was treated with 27 gms of MeOH and then a small amount of acetic acid and enough water for complete hydrolysis was added, the mixture was shaken until clear and then was used without extensive aging.

E was used at 20 weight % in MeOH by using the same method as for D.

All primers were filtered before use.

All samples were hand dipped in the primer solutions and the excess material was allowed to drip off. The samples were then dried as shown in the tables.

Table I shows the silanes or combination of silanes that were used in the examples. "Sample #" is the reference number for the runs that were carried out for these examples. "Silane #1" is the organofunctional silane used in the sample. "Silane #2" is the organosilane used in the sample. "Acid added" and "H$_2$O added" means that the material was used as a hydrolyzate, in the hydrolysis water, with the alcohol by-produced upon hydrolysis. In those cases where the silane was used neat, that is without prior hydrolysis, it is so indicated.

TABLE I

| Sample # | Silane #1 | Silane #2 | Solvent for #1 | Solvent for #2 | H$_2$O added | Acid added |
|---|---|---|---|---|---|---|
| 1 | A | — | IPA | — | yes | No |
| 2 | B | — | IPA | — | yes | yes |
| 3 | C | — | MeOH | — | yes | — |
| 4 | C | B | MeOH | IPA | yes | yes |
| 5 | A | B | MeOH | IPA | yes | yes |
| 6 | — | E | — | MeOH | yes | — |

In Table II, the sample # from Table I indicates the silane(s) used in that particular run. If more than one run was made using the same silane but a different substrate or deposited metal, the run was designated a, b, c, etc. For example, from Table I, sample 4 is a primer made up of silanes C and B. Table II, sample 4a shows that the silanes were used in a ratio of 2.4:1, there was present 1.3 weight percent total silane in the primer, the substrate in the run was glass and the deposited metal was silver solder. Sample 4b in Table II shows the primer of sample 4 of Table I, having the same ratio of silanes at the same weight percent solids but the substrate is now acrylic sheet and the deposited metal is aluminum.

All samples in Table II were vapor deposited using a Mikros Vacuum Evaporator Model VE-10 manufactured by Thermionics Laboratories, Hayward, CA.

TABLE II

| Sample # | Substrate | Deposited Metal Coating | Dry/Cure Conditions | Adhesion | * | Ratio of Silanes #1:2 | Total Weight % Silane(s) |
|---|---|---|---|---|---|---|---|
| 1 | glass | silver solder | 30 min/30 min. @25° C./@150° C. | Fair | A | — | 1 |
| 2 | glass | silver solder | 30 min/30 min @25° C./@150° C. | Excellent | A | — | 1.5 |
| 3 | glass | silver solder | 30 min/30 min @25° C./@150° C. | Good | A | — | 0.4 |
| 4a | glass | silver solder | 35 min/30 min @25° C./@150° C. | Excellent | A | 2.4:1 | 1.3 |
| 4b | acrylic sheet | Aluminum | None/None | Fair | A | 2.4:1 | 1.3 |
| 4c | Oxford ABS | Aluminum | 30 min/1hr. @ @25° C./80° C. | Good | A | 2.4:1 | 1.3 |

TABLE II-continued

| Sample # | Substrate | Deposited Metal Coating | Dry/Cure Conditions | Adhesion | * | Ratio of Silanes #1:2 | Total Weight % Silane(s) |
|---|---|---|---|---|---|---|---|
| 4d | Ryton-R8 | Aluminum | 30 min/1 hr. @ @25° C./80° C. | Good | A | 2.4:1 | 1.3 |
| 4e | Noryl | Aluminum | 30 min/1 hr. @ @25° C./80° C. | Good | A | 2.4:1 | 1.3 |
| 4f | Minlon | Aluminum | 30 min/1 hr. @ @25° C./80° C. | Good | A | 2.4:1 | 1.3 |
| 4g | Aluminum panel | chromium | 30 min./1 hr. @ @25° C./80° C. | Excellent | A | 0.8:1 | 1.35 |
| 4h | steel | silver | 30 min./65 min@ @25° C./100° C. | Excellent | A | 0.6:1 | 1.1 |
| 4i | Sioplas® crosslinked polyethylene | Aluminum | 5 min./60 min@ @25° C./75° C. | Excellent | A | 2.4:1 | 1.3 |
| 4j | polyethylene | Aluminum | 5 min./60 min@ @25° C./75° C. | Excellent | A | 2.4:1 | 1.3 |
| 4k | Lexan® polycarbonate | silver | 5 min./10 min@ @25° C./100° C. | Excellent | I | 0.6:1 | 1.1 |
| 4l | wood | silver | 60 min/38 min@ @25° C./75° C. | poor | A | 0.6:1 | 1.1 |
| 4m | paper | silver | 10 min/38 min@ @25° C./75° C. | good | A | 0.6:1 | 1.1 |
| 4n | silicone circuit board | silver | 60 min/38 min @25° C./@75° C. | Excellent | A | 0.6:1 | 1.1 |
| 4o | silicone epoxy circuit board | silver | 60 min/38 min @25° C./@75° C. | Good | A | 0.6:1 | 1.1 |
| 4p | Teflon® cloth | silver | 2 min/48 min @25° C./@100° C. | None | I | 0.6:1 | 1.1 |
| 4q | polyester | silver | 30 min/30 min @25° C./@100° C. | Excellent | A | 0.6:1 | 1.1 |
| 4r | glass | Aluminum | 30 min/50 min @25° C./@80° C. | Good | A | 0.8:1 | 1.3 |
| 4s | glass | copper | 30 min/30 min @25° C./@150° C. | Excellent | A | 0.8:1 | 1.35 |
| 4t | glass | chromium | 30 min/30 min @25° C./@150° C. | Excellent | A | 0.8:1 | 1.35 |
| 4u | glass | nickel | 30 min/30 min @25° C./@150° C. | Excellent | A | 0.8:1 | 1.35 |
| 4v | glass | tin | 30 min/60 min @25° C./@100° C. | Excellent | A | 0.6:1 | 1.1 |
| 4w | glass | silver | 30 min/60 min @25° C./@80° C. | Excellent | A | 2.4:1 | 1.3 |
| 4x | glass | gold | 30 sec./30 min. @25° C./@100° C. | Excellent | A | 0.8:1 | 1.35 |
| 2a** | glass | silver | 30 min/10 min @25° C./@120° C. | Excellent | A | — | 10.0 |
| 2b** | glass | silver | 30 min/10 min @25° C./@120° C. | Good | A | — | 100 |
| 2c** | glass | silver | 30 min/10 min @25° C./@120° C. | Fair | A | — | 0.1 |
| 2d** | glass | silver | 30 min/10 min @25° C./@120° C. | Fair | A | — | 0.01 |
| 3a** | glass | silver | 30 min/10 min.@ @25° C./@120° C. | Good | A | — | 100.0 |
| 3b** | glass | silver | 30 min/10 min.@ @25° C./@120° C. | Good | A | — | 10.0 |
| 3c** | glass | silver | 30 min/10 min.@ @25° C./@120° C. | Poor | A | — | 1.0 |
| 3d** | glass | silver | 30 min/10 min@ @25° C./@120° C. | None | A | — | .1 |
| 3e** | glass | silver | 30 min/10 min.@ @25° C./@120° C. | None | A | — | 0.01 |
| 4y | glass | silver | 30 min./10 min.@ @25° C./@120° C. | Fair | A | 2.4:1 | 1.1 |
| 4z | glass | silver | 30 min/10 min.@ @25° C./@120° C. | Fair | A | 0.6:1 | 1.1 |
| 5 | glass | silver | 2 min/30 min@ @25° C./@100° C. | Excellent | I | 1:1 | 2.0 |
| 6 | glass | aluminum | 5 min/20 min@ @25° C./@100° C. | Good | A | — | 2.0 |

*A = acetone
I = IPA
M = MeOH
** = no acid, no water

EXAMPLE 2

In order to compare the material of British Pat. No. 1,550,532 against the present invention, the following material was prepared. One hundred eighty gms of a silicate based polymer containing methyltrimethoxysilane was mixed with 20 gms of Acryloid OL-42. Acryloid OL-42 is an acrylic polymer similar to that found in the British patent in Example 1. The Acryloid is 80% solids in cellosolve acetate. One gram of hexamethylenetetramine catalyst was also added with agitation.

A primer (P) was prepared for use herein which consisted of 8 gms of HS(CH$_2$)$_3$Si(OCH$_3$)$_3$ diluted with 800 gms of IPA, 24 gms of 40% in MeOH of

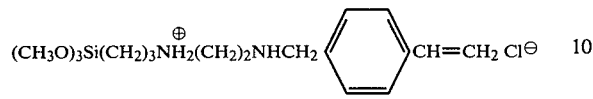

diluted with 800 gms of additional MeOH. Seventy-five gms of the dilute HS(CH$_2$)$_3$Si(OCH$_3$)$_3$ was mixed with 25 gms of the dilute

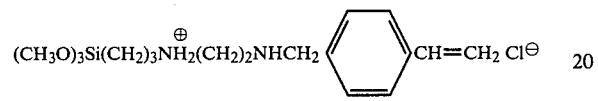

and a small amount of acetic acid and water and the mixture was stirred until clear.

A Lexan ® polycarbonate slide was abraded with emery paper to simulate an abused article from manufacturing. After the slide was cleaned, it was measured off in 4 equal sections and marked and one section was dipped in the solution of primer (P) from above and then allowed to air dry for 20 minutes at room temperature.

The solution of acrylate polymer, silicate and alkoxysilane analogous to that found in Example 1 of British Pat. No. 1,550,532 was then applied to ¾ of the slide and the ¼ primed area was overcoated thereby and air dried. The coating was then cured 15 min. @70° C. and 20 min. @100° C. Next, ½ of the slide was dipped in a solution of P and allowed to air dry for 10 minutes at room temperature. Finally, the whole slide was vapor deposited with silver metal and cured for 15 min. @100° C. If one were to lay the slide on its edge and note the coatings or layers on the top of the slide, the left-most ¼ section (denoted A) would have a silver coating only. Moving to the right, the next ¼ section (denoted B) would have a top layer of silver covering a layer of the British Pat. No. 1,550,532 polymer which in turn covers the polycarbonate slide. The third ¼ section (denoted C) would have a top layer of silver covering a layer of P primer which in turn covers the British Pat. No. 1,550,532 polymer which in turn covers the polycarbonate slide. The last ¼ section (denoted D) consists of a top layer of silver, a second layer of the primer P, a third layer of the British Pat. No. 1,550,532 and finally a fourth layer of primer P.

Sections B, C, and D were scored into crosshatched squares by a sharp instrument to give 25 equal squares. Scotch Brand adhesive tape #650 was then pressed onto the crosshatched squares and removed forcibly. Recognizing that the most optimum conditions were not observed, the test was deemed to have been passed if at least 50% or more of the silver metal remained intact. Table III shows the results.

TABLE III

| Sample | Pass/Fail | % Retention of Silver | Appearance of Remaining Silver |
| --- | --- | --- | --- |
| B | failed* | 0 | — |
| C | passed | 65 | smooth/brilliant |
| D | passed | 65 | smooth/brilliant |

*loss of adhesion occurred at the silver/basecoat interface.

EXAMPLE 3

A silicone resin was prepared according to Examle 2 of U.S. Pat. No. 4,173,553 with the exception that the HS(CH$_2$)$_3$Si(OCH$_3$)$_3$ was present at 10 weight percent CH$_3$Si(OCH$_3$)$_3$ at 40 weight percent and colloidal silica at 50 weight percent based on the weight of all three components. This material is shown herein as "A". Another sample of silicone resin was prepared as shown in Example 1 of U.S. Pat. No. 3,986,997, that is, the same material as above but without HS(CH)$_2$Si(OCH$_3$)$_3$ and this was designated "B". The two materials were compared side-by-side for their ability to accept and adhere metals which were deposited thereon. Both materials were diluted to approximately 10% solids with isopropanol.

A clean square of Lexan ® polycarbonate was dipped ½ into "A". The remaining ½ was dipped in "B". The sample was then air dried for 40 minutes at 25° C. The sample was then vapor deposited with silver. The sample then cured 1 hour at 125° C. The samples both had excellent specularity. The samples were subjected to a methanol rub to test the adhesion of the silver. The material "A" was clearly superior in retaining the silver metal.

EXAMPLE 4

The silicone resin designated "B" in Example 3 above, was coated onto a clean Lexan ® polycarbonate square and cured 25 minutes at 100° C. One-half of the coated slide was then dipped into a primer designated earlier as primer P of Example 2 and this was allowed to dry for 2 minutes at 25° C. The square was then vapor deposited with silver and cured 1 hour at 125° C. The ½ side of the slide that had been primed with primer P of Example 2 showed superior retention of the silver deposited thereon.

The means of metal deposition described in this specification and claims are conventional means for depositing metals and it is believed that elaborate descriptions of such methods are not required by those skilled in the art.

That which is claimed is:

1. A method of forming an adherent metal surface on a substrate by
(I) treating a solid substrate with at least one organofunctionalsilane, or the partial hydrolyzates thereof, having the general formula

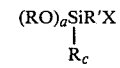

or a mixture of an organofunctional silane or the partial hydrolyzates thereof with a different organosilane, or the partial hydrolyzates thereof, which has the general formula

in which formulae R is an alkyl radical of 1–4 carbon atoms, R' is a difunctional hydrocarbon radical having from 1–2 carbon atoms or a —CH$_2$CH$_2$CH$_2$NHCH$_2$CH$_2$—radical X is an —NH$_2$,

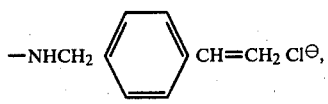

—SH, OH or Cl radical, R" is an —(R'X) radical, a and b each have a value of 2 or 3, c has a value of 0 or 1 and a+c=3;

(II) drying the silane treated surface until the majority of volatile materials have been removed and thereafter, (III) vapor depositing a metal on the silane treated surface to form a thin continuous film or coating thereon.

2. A method as claimed in claim 1 wherein the organofunctional silane is (CH$_3$O)$_3$Si(CH$_2$)$_3$SH.

3. A method as claimed in claim 1 wherein the organofunctional silane is

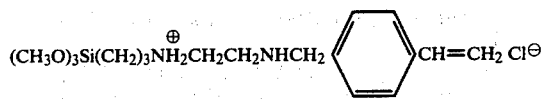

and the organosilane is (CH$_3$O)$_3$Si(CH$_2$)$_3$SH.

4. A method as claimed in claim 3 wherein the weight ratio of the organofunctional silane to organosilane is 1:1.

5. A method as claimed in claim 1 wherein in step I, the organofunctional silane and organosilane are partial hydrolyzates.

6. A method as claimed in claim 5 wherein the partial hydrolyzates are present at 0.1 to 10 weight percent based on the weight of solvent, water and silanes present.

7. A method as claimed in claim 6 wherein the partial hydrolyzates are present at 0.5–2.5 weight percent based on the weight of solvent, water and silanes present.

8. A method as claimed in claim 1 wherein in step III, the metal deposited is selected from a group consisting of copper, nickel, tin, silver, silver solder, gold, aluminum, platinum, titanium, zinc and chrome.

9. A method as claimed in claim 8 wherein the metal deposited is silver.

10. A method as claimed in claim 8 wherein the metal deposited is aluminum.

11. A method as claimed in claim 8 wherein the metal deposited is chrome.

12. A method as claimed in claim 8 wherein the metal deposited is nickel.

13. A method as claimed in claim 8 wherein the metal deposited is copper.

14. A method as claimed in claim 8 wherein the metal deposited is gold.

15. A method as claimed in claim 8 wherein the metal deposited is silver solder.

16. A method as claimed in claim 1 wherein the substrate is selected from a group consisting of plastics, wood, cardboard, glass, metals, silicone rubbers and silicone resins.

17. A method as claimed in claim 16 wherein the substrate is glass.

18. A method as claimed in claim 16 wherein the substrate is plastic.

19. A method as claimed in claim 16 wherein the substrate is metal.

20. A method as claimed in claim 17 wherein the glass is float glass.

21. A method as claimed in claim 18 wherein the plastic is polycarbonate.

22. A method as claimed in claim 18 wherein the plastic is acrylic.

23. A method as claimed in claim 18 wherein the plastic is nylon.

24. A method as claimed in claim 18 wherein the plastic is an acrylonitrile-butadiene-styrene copolymer.

25. A method as claimed in claim 18 wherein the plastic is polyethylene.

26. A method as claimed in claim 18 wherein the plastic is crosslinked polyethylene.

27. A method as claimed in claim 19 wherein the substrate is aluminum.

28. A method as claimed in claim 19 wherein the substrate is steel.

29. A method as claimed in claim 21 wherein the polycarbonate is in the form of a lens.

30. A method as claimed in claim 21 wherein the polycarbonate is in the form of a flat sheet.

31. A method as claimed in claim 21 wherein the polycarbonate is in the form of a thermoformed sheet.

32. A method as claimed in claim 22 wherein the acrylic is in the form of a lens.

33. A method as claimed in claim 22 wherein the acrylic is in the form of a flat sheet.

34. A method of forming an adherent metal surface on a substrate by (I) treating a solid substrate with a curable organic or silicone basecoat and curing said basecoat;

(II) treating said cured basecoat with at least one organofunctional silane, or the partial hydrolyzates thereof, having the general formula

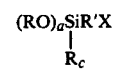

or a mixture of an organofunctional silane or the partial hydrolyzates thereof with a different organosilane, or the partial hydrolyzates thereof, which has the general formula

in which formulae R is an alkyl radical of 1–4 carbon atoms, R' is a difunctional hydrocarbon radical having from 1–2 carbon atoms or a —CH$_2$CH$_2$CH$_2$NHCH$_2$CH$_2$— radical, X is an —NH$_2$,

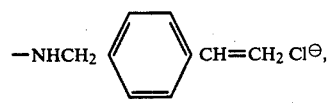

—SH, OH or Cl radical, R" is an —(R'X) radical, a and b each have a value of 2 or 3, c has a value of 0 or 1 and a+c=3;

(III) drying the silane treated surface until the majority of volatile materials have been removed and thereafter, (IV) vapor depositing a metal on the silane treated surface to form a thin continuous film or coating thereon.

35. A method as claimed in claim 34 in which the curable organic basecoat is a curable acrylic polymer.

36. A method as claimed in claim 34 in which the curable organic basecoat is a curable polyester polymer.

37. A method as claimed in claim 34 in which the curable organic basecoat is a curable polyurethane polymer.

38. A method as claimed in claim 34 in which the curable organic basecoat is a curable epoxy polymer.

39. A method as claimed in claim 34 in which the curable organic basecoat is a curable silicone-epoxy copolymer.

40. A method as claimed in claim 34 in which the curable silicone basecoat is a silicone elastomer.

41. A method as claimed in claim 34 in which the curable silicone basecoat is a silicone resin.

42. A method as claimed in claim 41 wherein the curable silicone basecoat is a silicone resin which is a pigment-free aqueous coating composition comprising a dispersion of colloidal silica in lower aliphatic alcohol-water solution of the partial condensate of a silanol of the formula $RSi(OH)_3$ in which R is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$, said composition containing 10 to 50 weight percent solids consisting essentially of 10 to 70 weight percent colloidal silica and 30 to 90 weight percent of the partial condensate, said composition containing sufficient acid to provide a pH in the range of 3.0 to 6.0.

43. A method of forming an adherent metal surface on a substrate by (I) treating a solid substrate with a curable organic or silicone basecoat which contains at least one organofunctional silane, or the partial hydrolyzate thereof, having the general formula $$(RO)_a SiR'X$$
$$|$$
$$R_c$$

or a mixture of an organofunctional silane, or the partial hydrolyzate thereof, with a different organosilane, or the partial hydrolyzate thereof, which has the general formula $$(RO)_b SiR''_{4-b}$$

in which formulae R is an alkyl radical of 1–4 carbon atoms, R' is a difunctional hydrocarbon radical having from 1–12 carbon atoms or a $-CH_2CH_2CH_2NHCH_2CH_2-$ radical, X is an $-NH_2$, $$-NHCH_2 \langle \text{phenyl} \rangle CH=CH_2 \, Cl^{\ominus},$$

$-SH$, OH or Cl radical, R'' is an $-(R'X)$ radical, a and b each have a value of 2 or 3, c has a value of 0 or 1 and $a+c=3$;

(II) drying the basecoat until the majority of volatiles have been removed and thereafter;

(III) vapor depositing a metal on the basecoat to form a thin continuous film or coating thereon.

44. The method of claim 1 wherein there is also present a clear topcoat on the vapor deposited metal surface.

45. A method as claimed in claim 34 wherein there is also present a clear topcoat on the vapor deposited metal surface.

46. A method as claimed in claim 43 wherein there is also present a clear topcoat on the vapor deposited metal surface.

47. An article prepared by the method of claim 43 wherein the substrate is glass, the organofunctional silane is $$(CH_3O)_3Si(CH_2)_3\overset{\oplus}{N}H_2CH_2CH_2NHCH_2 \langle \text{phenyl} \rangle CH=CH_2 \, Cl^{\ominus},$$

the organosilane is $(CH_3O)_3Si(CH_2)_3SH$, the ratio of organofunctional silane to organosilane is 1:1, the silanes are used as a 2.5 weight percent water-alcohol solution and the vapor deposited metal is silver.

48. The article as claimed in claim 47 wherein the article is further topcoated with a clear, cured, protective coating.

49. An article prepared by the method of claim 1.

50. An article prepared by the method of claim 34.

51. An article prepared by the method of claim 42.

52. An article prepared by the method of claim 43.

53. The methods as claimed in claims 1, 34 or 43 wherein the solid substrate is primed with an adhesion promoter.

54. An article as claimed in claims 47, 48, 49, 50, 51 or 52 wherein the article is primed with an adhesion promoter.

* * * * *

UNITED STATES PATENT AND TRADEMARK OFFICE
CERTIFICATE OF CORRECTION

PATENT NO. : 4,315,970
DATED : Feb. 16, 1982
INVENTOR(S) : James B. McGee

It is certified that error appears in the above-identified patent and that said Letters Patent is hereby corrected as shown below:

In Column 4, line 67 "second," should read -- seconds, --.

In Columns 9 & 10, Table II-continued, line 31, "30 min/50 min" should read -- 30 min/60 min --.

In Column 12, line 11, "Examle 2" should read -- Example 2--.

In Column 13, line 3 "1-2 carbon" should read -- 1-12 carbon --.

In Column 14, line 57, "1-2 carbon" should read -- 1-12 carbon --

Signed and Sealed this

Twenty-third Day of October 1984

[SEAL]

Attest:

GERALD J. MOSSINGHOFF

Attesting Officer  Commissioner of Patents and Trademarks